US011480679B2

(12) United States Patent
Tanemura et al.

(10) Patent No.: US 11,480,679 B2
(45) Date of Patent: Oct. 25, 2022

(54) DISTANCE MEASUREMENT SENSOR

(71) Applicant: DENSO CORPORATION, Kariya (JP)

(72) Inventors: Tomoki Tanemura, Kariya (JP); Koichi Oyama, Kariya (JP); Taku Suzuki, Kariya (JP); Daisuke Inoue, Kariya (JP)

(73) Assignee: DENSO CORPORATION, Kariya (JP)

(*) Notice: Subject to any disclaimer, the term of this patent is extended or adjusted under 35 U.S.C. 154(b) by 536 days.

(21) Appl. No.: 16/690,370

(22) Filed: Nov. 21, 2019

(65) Prior Publication Data

US 2020/0088876 A1  Mar. 19, 2020

Related U.S. Application Data

(63) Continuation of application No. PCT/JP2018/016178, filed on Apr. 19, 2018.

(30) Foreign Application Priority Data

May 29, 2017 (JP) .............................. JP2017-105871

(51) Int. Cl.
G01S 17/32 (2020.01)
G01S 7/00 (2006.01)
G01S 7/481 (2006.01)

(52) U.S. Cl.
CPC .............. G01S 17/32 (2013.01); G01S 7/006 (2013.01); G01S 7/4811 (2013.01); G01S 7/4817 (2013.01)

(58) Field of Classification Search
CPC ........ G01S 7/4817; G01S 7/006; G01S 17/32; G01S 7/484; G09G 3/32; G07D 11/0036;
(Continued)

(56) References Cited

U.S. PATENT DOCUMENTS 9,916,713 B1 * 3/2018 Yacoubian ............... G07D 3/14
2015/0185060 A1   7/2015 Tokuyasu et al.
(Continued)

FOREIGN PATENT DOCUMENTS

JP    2015-129646 A    7/2015
JP    2016-105082 A    6/2016

OTHER PUBLICATIONS

Paul J. M. Suni et. al., "Photonic Integrated Circuits for Coherent Lidar," 18th Coherent Laser Radar Conference, Jun. 26-Jul. 1, 2016, Cooperative Institute for Research in Environmental Sciences (pp. 1-6).

Primary Examiner — Phuoc H Doan
(74) Attorney, Agent, or Firm — Posz Law Group, PLC

(57) ABSTRACT

A distance measurement sensor that detects a distance to an object based on heterodyne detection using light generated from a light source and another light received by a light receiver, includes: a scanning unit which scans the light in a first direction; a diffusing lens which diffuses the light in a second direction; multiplexers which multiplex the light and the another light to provide optical signals, respectively; and a processor which detects the distance to the object based on the optical signals. The light receiver has light receiving antennas in the second direction. The multiplexers are connected to the light receiving antennas, respectively. The processor performs a parallel processing for detecting the distance to the object based on the optical signals with respect to the light receiving antennas individually.

27 Claims, 12 Drawing Sheets

(58) Field of Classification Search
CPC ........ G07D 3/14; G07D 5/005; G01B 9/0203; A61B 5/0066; G02B 27/0172
USPC ............................ 356/4.01; 141/298; 232/16
See application file for complete search history.

(56) References Cited

U.S. PATENT DOCUMENTS

| | | |
|---|---|---|
| 2015/0185244 A1 | 7/2015 | Inoue et al. |
| 2016/0291135 A1 | 10/2016 | Ando et al. |
| 2020/0295827 A1* | 9/2020 | Watanabe ............ H04B 10/112 |

* cited by examiner

DISTANCE MEASUREMENT SENSOR

CROSS REFERENCE TO RELATED APPLICATION

The present application is a continuation application of International Patent Application No. PCT/JP2018/016178 filed on Apr. 19, 2018, which designated the U.S. and claims the benefit of priority from Japanese Patent Application No. 2017-105871 filed on May 29, 2017. The entire disclosures of all of the above applications are incorporated herein by reference.

TECHNICAL FIELD

The present disclosure relates to a distance measurement sensor.

BACKGROUND

Conventionally, a LIDAR (Light Detection and Ranging) system for detecting a distance to an object or the like using a laser has been proposed. As an example of the LIDAR system, a LIDAR system of a TOF (Time of Flight) type which measures a round-trip time of pulsed light is known. However, to perform detection of a long distance of 100 m or more required for an in-vehicle use, in measurement principle, the TOF-type LIDAR system needs to be increased in size, and is therefore inappropriate for an in-vehicle use in which a location where the TOF-type LIDAR system is mounted is rather restricted.

Meanwhile, there is a LIDAR system of a FMCW (Frequency Modulated Continuous Wave) type which calculates a distance to an object based on heterodyne detection that combines emitted light and received light and checks a frequency difference therebetween. Unlike the TOF-type LIDAR system, the FMCW-type LIDAR system can be reduced in size.

For example, a LIDAR system has components such as a light source, a scanning unit, a receiver, and a processing circuit which are integrated in a single semiconductor chip using silicon photonics technology. Such a LIDAR system can be reduced in size compared to the LIDAR system described above in which components are separately configured. In addition, since the number of process steps for optical implementation is small, production cost can be reduced.

Moreover, the FMCW-type LIDAR system has a high sensitivity, and is therefore capable of long-distance detection required of an in-vehicle LIDAR system.

SUMMARY

According to an example, a distance measurement sensor that detects a distance to an object based on heterodyne detection using light generated from a light source and another light received by a light receiver, includes: a scanning unit which scans the light in a first direction; a diffusing lens which diffuses the light in a second direction; multiplexers which multiplex the light and the another light to provide optical signals, respectively; and a processor which detects the distance to the object based on the optical signals. The light receiver has light receiving antennas in the second direction. The multiplexers are connected to the light receiving antennas, respectively. The processor performs a parallel processing for detecting the distance to the object based on the optical signals with respect to the light receiving antennas individually.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
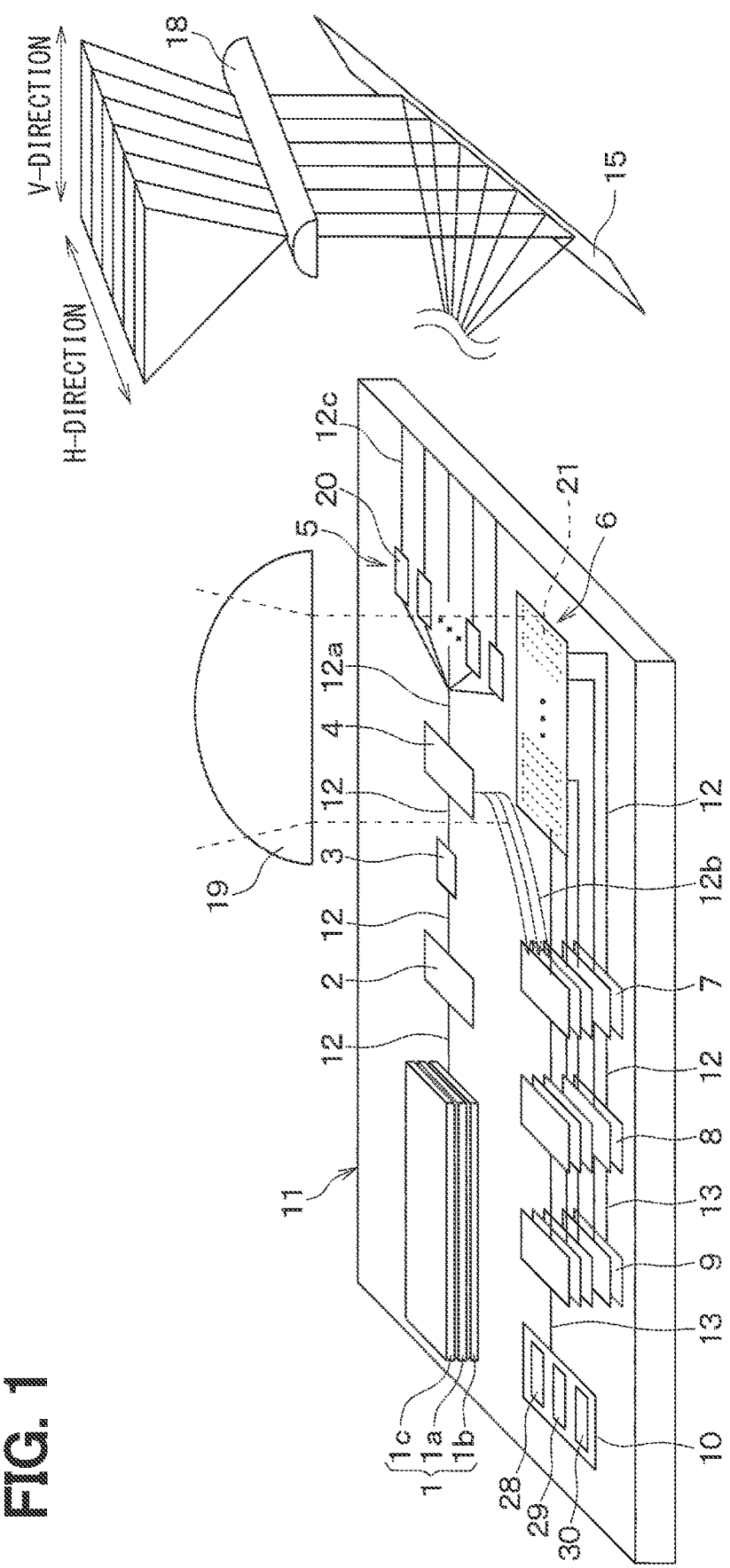
FIG. 1 is a view showing an overall configuration of a distance measurement sensor according to a first embodiment.

In recent years, an in-vehicle LIDAR system is required to perform not only longer-range detection, but also wider-angle detection. For example, when distances to respective objects included in a plurality of regions arranged in horizontal and vertical directions or the like are to be measured, the in-vehicle LIDAR system is required to perform measurement at a total of 30000 points resulting from multiplication of 1500 points in the horizontal direction by 20 points in the vertical direction.

However, a time period required for the heterodyne detection normally ranges from 10 to 100 μsec. At a 20 Hz frame rate particularly required for an in-vehicle use, i.e., a 50 msec period, the number of times measurement is performed during one period ranges from 500 to 5000, which cannot satisfy the requirement for wider-angle detection. Accordingly, a distance measurement sensor capable of operating a frame rate higher than that achieved conventionally is required.

In view of the point described above, a distance measurement sensor is provided to be capable of operating at a high frame rate.

To attain the object described above, a distance measurement sensor is provided in which a light source for generating light and a light receiver to be irradiated with reflected light of the light generated from the light source are formed in a single substrate. The distance measurement sensor detects a distance to an object included in a predetermined region of an external space in one direction and another direction which are perpendicular to each other based on heterodyne detection using the light generated from the light source and the light applied to the light receiver and includes a scanning unit which causes the light generated from the light source to scan in a direction corresponding to the one direction, a diffusing lens which diffuses the light generated from the light source in a direction corresponding to the other direction, a plurality of multiplexers which multiplex the light generated from the light source and the light applied to the light receiver to form optical signals, and a processing unit which calculates the distance to the object based on the optical signals formed by the multipliers. The light receiver has a plurality of light receiving antennas arranged in the direction corresponding to the other direction. The multiplexers are individually connected to the plurality of respective light receiving antennas. The processing unit performs parallel processing of calculation of the distance to the object based on the optical signals formed by the multiplexers for the plurality of individual light receiving antennas.

In accordance with the above features, the light from the light source is diffused by the diffusing lens. This allows the light to simultaneously irradiate the wide region. In addition, the plurality of light receiving antennas are arranged in the direction corresponding to the direction in which the light is diffused, and the multiplexing of the light from the light source and light beams applied to the light receiving antennas and the calculation of the distance to the object are processed in parallel for the plurality of individual light receiving antennas. Accordingly, it is possible to simultaneously measure distances to objects present in an external space over a wide region of the external space and allow the distance measurement sensor to operate at a high frame rate.

The following will describe embodiments of the present disclosure on the basis of the drawings. In the following description of the individual embodiments, like or equivalent component parts are given like reference characters or numerals.

First Embodiment

A description will be given of the first embodiment. A distance measurement sensor of the present embodiment is used as, e.g., an in-vehicle LIDAR system and irradiates, with light, a region of a space outside a vehicle which is included in a predetermined range in two directions perpendicular to each other to detect a distance to an object outside the vehicle or the like.

As shown in FIG. 1, the distance measurement sensor of the present embodiment includes a LD (laser diode) 1, a modulator 2, an amplifier 3, a demultiplexer 4, a scanning unit 5, a light receiver 6, multiplexers 7, converters 8, TIAs (transimpedance amplifiers) 9, and a calculation unit 10. These components are formed on a substrate 11 based on silicon photonics to form an optical integrated chip. On the substrate 11, optical waveguides 12 which transmit an optical signal and wires 13 which transmit an electric signal are formed. The optical waveguides 12 correspond to a signal transmission optical waveguide.

Figure 2:
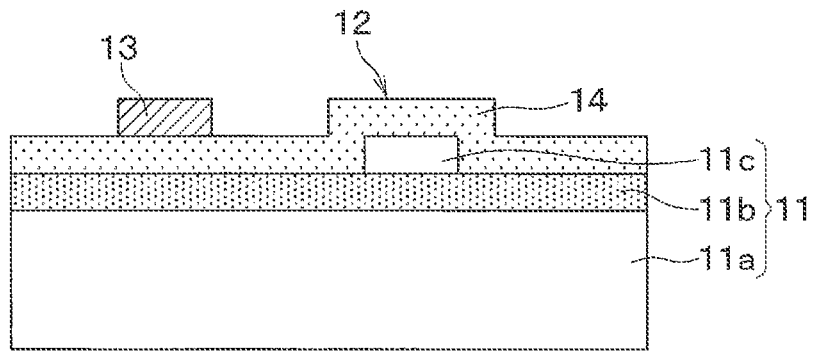
FIG. 2 is a cross-sectional view of a substrate shown in FIG. 1.

As shown in FIG. 2, the substrate 11 is a SOI (Silicon on Insulator) substrate in which a supporting layer 11a formed of Si, a sacrificial layer 11b formed of SiO$_2$, and an active layer 11c formed of Si are stacked in this order. A top surface of the substrate 11 is formed in a square shape having sides of, e.g., 10 mm.

The active layer 11c has a portion removed by etching. The active layer 11c and the sacrificial layer 11b exposed as a result of removing the active layer 11c are covered with an insulating film 14 formed of SiO$_2$. Thus, each of the optical waveguides 12 is configured to have the active layer 11c as a core layer and have each of the sacrificial layer 11b covering the active layer 11c and the insulating film 14 as a clad layer. Each of the wires 13 is formed of a layer made of Al or the like formed in a top surface of the insulating film 14.

In the present embodiment, the core layer of each of the optical waveguides 12 is formed of Si, while the clad layer of the optical waveguide 12 is formed of SiO$_2$. However, each of these layers may also be formed of another material. It is preferable that the core layer of the optical waveguide 12 is formed of Si or at least one material selected from the group consisting of SiO$_2$, SiN, SiON, LN (LiNbO$_3$), and InP each doped with an impurity. It is also preferable that the clad layer of the optical waveguide 12 is formed of at least one material selected from the group consisting of SiO2, SiN, SiON, LN, and InGaAsP. Note that the core layer and the clad layer are formed of different materials. A refractive index of the core layer is set higher than that of the clad layer. In such a configuration, an optical signal is efficiently transmitted by the optical waveguide 12 to improve an SNR (Signal Noise Ratio) of the distance measurement sensor.

Figure 3:
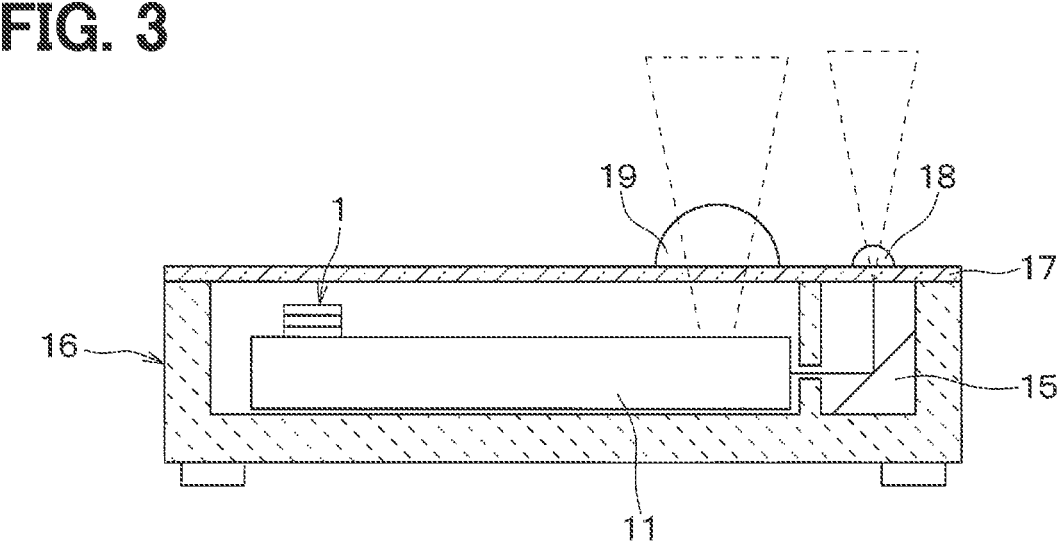
FIG. 3 is a cross-sectional view of the distance measurement sensor according to the first embodiment.

As shown in FIG. 3, the distance measurement sensor is provided as an optical package including a mirror 15, a case 16, a lid 17, a diffusing lens 18, and a condensing lens 19. The case 16 is a cubic frame body having an open surface and a space formed therein, and is formed of ceramic or the like. The substrate 11 and the mirror 15 are disposed in the case 16. The opening portion of the case 16 is covered with the lid 17. The diffusing lens 18 and the condensing lens 19 are disposed outside the lid 17.

Figure 4:
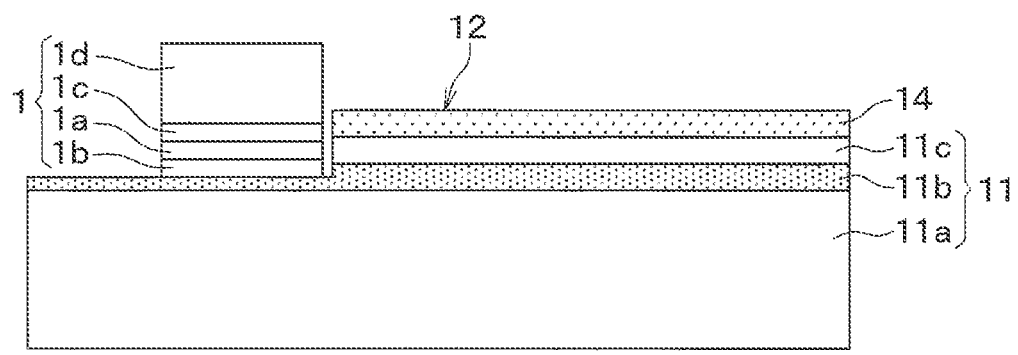
FIG. 4 is a cross-sectional view of a light source shown in FIG. 1.

A description will be given of a detailed configuration of the distance measurement sensor. The LD 1 is intended to generate light to be emitted to the outside of the distance measurement sensor and corresponds to a light source. In the present embodiment, the LD 1 is formed of a laser diode of a DFB (Distributed FeedBack) type which is mounted on the substrate 11 by flip chip bonding or the like. Specifically, as shown in FIGS. 1 and 4, the LD 1 includes an active layer 1a formed of a group III-V semiconductor, and a p-type clad layer 1b and an n-type clad layer 1c which are disposed on both sides of the active layer 1a. The LD 1 also includes an n-type substrate 1d and, on one surface of the n-type substrate 1d, the n-type clad layer 1c, the active layer 1a, and the p-type clad layer 1b are deposited in this order. As shown in FIG. 4, from a portion of the substrate 11, the insulating film 14, the active layer 11c, and a portion of the sacrificial layer 11b are removed. The LD 1 is disposed such that, on the remaining sacrificial layer 11b, the p-type clad layer 1b is stacked. In other words, on the sacrificial layer 11b, the p-type clad layer 1b, the active layer 1a, the n-type clad layer 1c, and the n-type substrate 1d are stacked in this order. The LD 1, which is formed of the group III-V semiconductor, has a large output.

In the present embodiment, a wavelength of the light generated from the LD 1 is adjusted to be 0.85 µm or more and 0.95 µm or less or 1.5 µm or more and 1.6 µm or less. As shown in FIG. 1, the LD 1 is connected to the modulator 2 by the optical waveguide 12, and an optical signal generated from the LD 1 is input to the modulator 2. Note that, as shown in FIG. 4, between the LD 1 and the optical waveguide 12, a gap is formed, and the light generated from the LD 1 enters the optical waveguide 12 through the gap.

Figure 5:
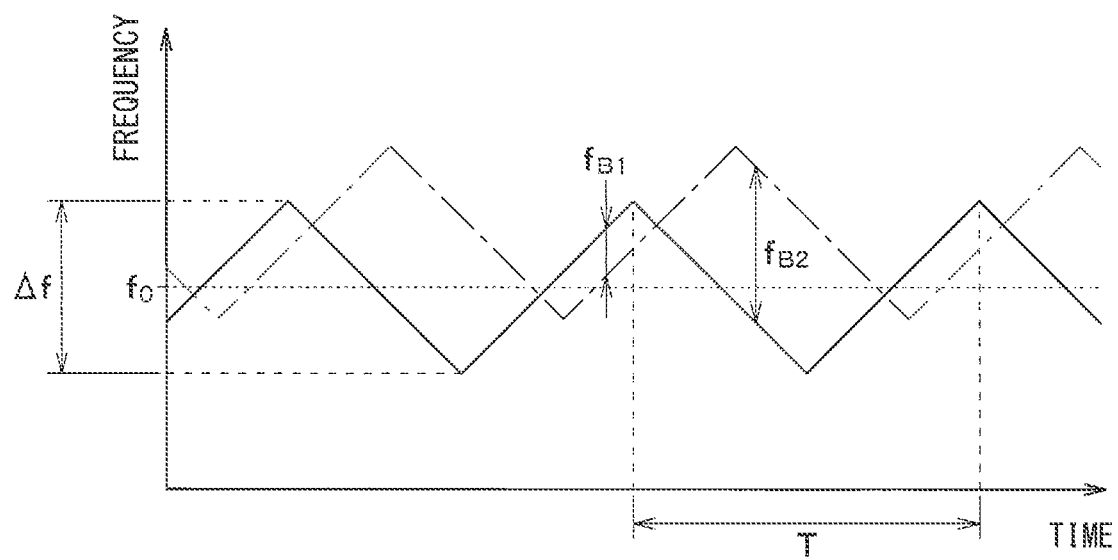
FIG. 5 is a graph showing changes in a frequency of an optical signal.

The modulator 2 modulates the frequency of the light generated from the LD 1. As the modulator 2, e.g., a SSB (Single Side Band) modulator or the like is used. Specifically, the frequency of the light generated from the LD 1 is changed by the modulator 2 as shown in FIG. 5. Specifically, the frequency repeatedly increases and decreases with a lapse of time, and a graph representing a relationship between the time and the frequency presents a triangular wave. Note that, in the graph of FIG. 5, a solid line indicates a frequency of the optical signal output from the modulator 2, and a one-dot-dash line indicates the frequency of the optical signal input from the light receiver 6 to one of the multiplexers 7.

As shown in FIG. 1, the modulator 2 is connected to the demultiplexer 4 by the optical waveguide 12 via the amplifier 3. The optical signal having the frequency modulated by the modulator 2 is amplified by the amplifier 3, and then input to the demultiplexer 4.

The demultiplexer 4 is formed of a coupler from which the optical waveguide 12 is branched. The optical signal input to the demultiplexer 4 has a portion input to the scanning unit 5 and the other portion input to the multiplexers 7. It is assumed that, of the optical waveguide 12, the portion connecting the demultiplexer 4 and the scanning unit 5 is an optical waveguide 12a and portions connecting the demultiplexer 4 and the multiplexers 7 are optical waveguides 12b.

As described above, the distance measurement sensor of the present embodiment irradiates, with the light, the region of the space outside the vehicle which is included in the predetermined range in the two directions perpendicular to each other to detect a distance to an object outside the vehicle or the like. Specifically, the distance measurement sensor divides a predetermined region of the space outside the vehicle into a plurality of regions in each of the horizontal direction and a direction perpendicular to a horizontal plane and calculates distances to respective objects included in the regions resulting from the division. The horizontal direction and the direction perpendicular to the horizontal plane are hereinafter referred to as a H-direction and a V-direction.

The plurality of multiplexer 7 are disposed based on a resolution of the distance measurement sensor in the V-direction, i.e., the number of segments into which the predetermined region described above is divided in the V-direction. The optical signal input to the demultiplexer 4 is divided and input to the plurality of multiplexers 7 via the optical waveguide 12b.

In the present embodiment, a resolution of the distance measurement sensor in the H-direction is set to 1500, while a resolution of the distance measurement sensor in the V-direction is set to 20. Correspondingly, the twenty multiplexers 7 are disposed, and the optical waveguide 12 is branched at the demultiplexer 4 into the one optical waveguide 12a and the twenty optical waveguides 12b.

The scanning unit 5 scans the optical signal input thereto in the H-direction. The scanning unit 5 of the present embodiment is formed of an OPA (Optical Phased Array). Specifically, as shown in FIG. 1, the optical waveguide 12a is branched into the scanning unit 5 and, when the optical waveguides 12 resulting from the branching are assumed to be optical waveguides 12c, respective phase shifters 20 are disposed over the individual optical waveguides 12c. Each of the optical waveguides 12c is formed so as to reach a side surface of the substrate 11 such that light is emitted from the optical waveguide 12c exposed at the side surface of the substrate 11 to the outside of the substrate 11. The optical waveguide 12c corresponds to a scanning optical waveguide.

The optical waveguide 12a of the present embodiment is branched to the optical waveguides 12c based on the resolution of the distance measurement sensor in the H-direction. The number of the phase shifters 20 disposed over the optical waveguides 12c is the same as the number of the optical waveguides 12c.

Each of the phase shifters 20 changes a phase of the optical signal input thereto from the demultiplexer 4 in response to an electric signal input thereto from a control circuit not shown. The phase of the optical signal passing through each of the optical waveguides 12c is periodically changed by the corresponding phase shifter 20 to periodically change a phase of light emitted from the optical waveguide 12c. As a result, a directionality of light emitted from the plurality of optical waveguides 12c as a whole is changed, and the light is caused to scan in the H-direction.

As shown in FIG. 3, the substrate 11 and the mirror 15 are disposed in the case 16 to cause the light emitted from the side surface of the substrate 11 to be applied to the mirror 15. The light emitted from the substrate 11 is reflected by the mirror 15 to be applied to the lid 17. The lid 17 is formed of glass which transmits the light emitted from the substrate 11 or the like, and the light applied to the lid 17 is transmitted by the lid 17 and applied to the diffusing lens 18.

The mirror 15 is intended to adjust a direction in which the light emitted from the substrate 11 travels such that a direction of travel of light applied to the diffusing lens 18 is parallel with a direction of travel of light applied from the condensing lens 19 to irradiate the light receiver 6. The mirror 15 corresponds to a direction adjustment mirror. In the present embodiment, the mirror 15 is disposed so as to adjust the direction of travel of the light applied to the diffusing lens 18 to a direction perpendicular to the top surface of the substrate 11.

It is assumed that the direction perpendicular to the top surface of the substrate 11 includes not only a direction exactly perpendicular to the top surface of the substrate 11, but also a direction substantially perpendicular to the top surface of the substrate 11. Likewise, it is also assumed that the direction parallel with the top surface of the substrate 11 includes not only a direction exactly parallel with the top surface of the substrate 11, but also a direction substantially parallel with the top surface of the substrate 11.

The diffusing lens 18 diffuses the light applied thereto to form a line beam, and is formed of a cylindrical lens or the like. The diffusing lens 18 of the present embodiment is disposed on a top surface of the lid 17 so as to diffuse the light applied thereto in the V-direction. The light diffused by the diffusing lens 18 is emitted to the outside of the distance measurement sensor. Then, the light reflected by objects outside the distance measurement sensor is applied to the condensing lens 19.

The condensing lens 19 is disposed on the top surface of the lid 17. The condensing lens 19 is intended to condense the reflected light of the light emitted from the diffusing lens 18 to the outside of the distance measurement sensor to apply the condensed reflected light to the light receiver 6. The condensing lens 19 has a protruding shape facing the opposite side of the lid 17. A direction of travel of the light applied to the light receiver 6 is caused by the condensing lens 19 to be perpendicular to the top surface of the substrate 11.

The light applied from the outside of the distance measurement sensor to the condensing lens 19 passes through the lid 17 to be applied to the light receiver 6. As shown in FIG. 1, the light receiver 6 includes a plurality of light receiving antennas 21 arranged in the V-direction, and the light having passed through the lid 17 is applied to each of the light receiving antennas 21. The twenty light receiving antennas 21 are disposed based on the resolution of the distance measurement sensor in the V-direction.

Figure 6:
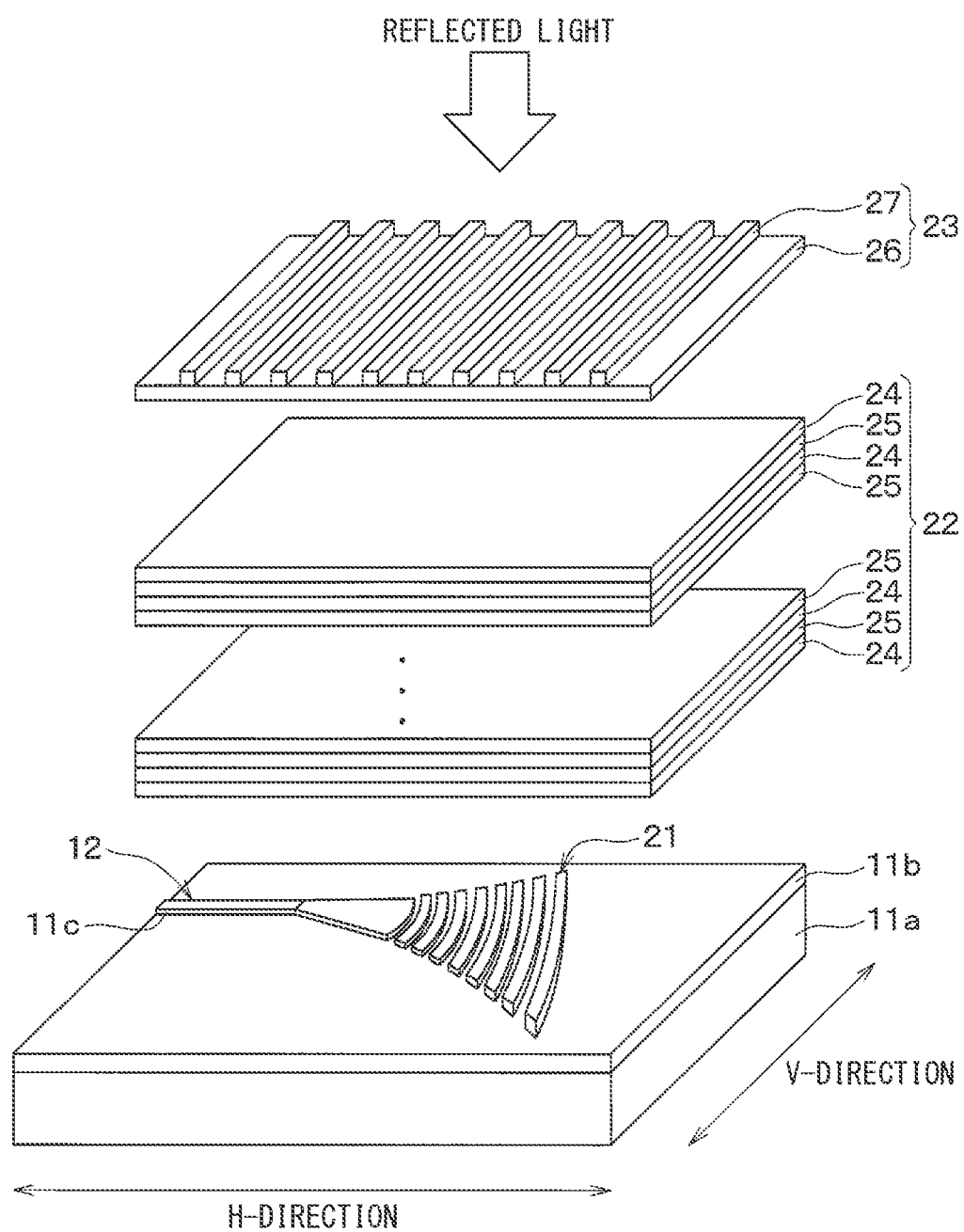
FIG. 6 is a perspective view showing filters stacked over each of light receiving antennas.

Each of the light receiving antennas 21 is formed of a diffractive grating as shown in FIG. 6. Note that, in FIG. 6, illustration of the insulating film 14 is omitted. The diffractive grating is formed of the active layer 11c having a sectoral shape which widens on both sides of an axis parallel with the H-direction. In the active layer 11c having the sectoral shape, a plurality of slits along a sectoral circumference are formed. Note that the diffractive grating forming the light receiving antenna 21 may also be formed of the active layer 11c having a sectoral shape which widens on both sides of an axis parallel with the V-direction.

As shown in FIG. 6, over each of the light receiving antennas 21, a BPF (bandpass filter) 22 and a polarization filter 23 are stacked. The BPF 22 allows light in a predetermined frequency band to pass therethrough, while blocking light in another frequency band. The BPF 22 includes $TiO_2$ films 24 each having a high refractive index and $SiO_2$ films 25 each having a low refractive index, which are alternately stacked. The BPF 22 has the $TiO_2$ films 24 in both of a lowermost layer and an uppermost layer thereof.

The polarization filter 23 allows light polarized in a predetermined direction to pass therethrough, while blocking light polarized in another direction. The polarization filter 23 includes a $SiO_2$ film 26 stacked on the BPF 22 and an Al wire grid 27 stacked on the $SiO_2$ film 26.

The BPF 22 and the polarization filter 23 remove light corresponding to unneeded noise components, and light in a predetermined frequency band polarized in a predetermined direction is applied to each of the light receiving antennas 21. The light receiving antennas 21 are connected by the optical waveguides 12 to the multiplexers 7, and the optical signals output from the light receiving antennas 21 are input to the multiplexers 7.

Note that, in each of the light receiving antennas 21 of the present embodiment, a width in the H-direction is set larger than a width in the V-direction. This allows the light receiving antenna 21 to receive the reflected light in a wide range in the H-direction, and thus improves the SNR of the distance measurement sensor.

Each of the multiplexers 7 multiplexes the optical signal input thereto from the demultiplexer 4 and the optical signal input from the corresponding light receiving antenna 21 to generate a waveform. The plurality of multiplexers 7 are disposed based on the resolution of the distance measurement sensor in the V-direction.

To each of the multiplexers 7, the respective optical signals are input from the demultiplexer 4 and the corresponding light receiving antenna 21, while outputting an optical signal formed by multiplexing the two optical signals input thereto. The multiplexers 7 are connected to the converters 8 via the optical waveguides 12, and the optical signals formed by the multiplexers 7 are input to the converters 8.

Each of the converters 8 converts the optical signal input thereto to an electric signal. The converter 8 of the present embodiment is formed of a PIN photodiode, and outputs a current signal based on the optical signal input thereto. Note that each of the converters 8 may also be formed of an avalanche photodiode.

Note that, when the wavelength of the light generated from the LD 1 is 0.85 μm or more and 0.95 μm or less as in the present embodiment, a photodiode formed of a Si semiconductor is used as each of the converters 8 to be able to improve the SNR of the distance measurement sensor. On the other hand, when the wavelength of the light generated from the LD 1 is 1.5 μm or more and 1.6 μm or less, a photodiode formed of a Ge semiconductor is used as each of the converters 8 to be able to improve the SNR of the distance measurement sensor.

As shown in FIG. 1, similarly to the multiplexers 7, the plurality of converters 8 are disposed based on the resolution of the distance measurement sensor in the V-direction. To each of the converters 8, the optical signal is input from the corresponding multiplexer 7. The converters 8 are connected to the TIAs 9 by the wires 13. Similarly to the converters 8, the plurality of TIAs 9 are disposed on the substrate 11. The current signal output from each of the converters 8 is input to the corresponding TIA 9.

Each of the TIAs 9 converts the current signal input thereto from the corresponding converter 8 to a voltage signal and outputs the voltage signal. Each of the TIAs 9 is connected to the calculation unit 10 by the wire 13, and the voltage signal output from the TIA 9 is input to the calculation unit 10.

The plurality of light receiving antennas 21, the plurality of multiplexers 7, the plurality of converters 8, and the plurality of TIAs 9 each described above can be formed on the substrate 11 using a batch process based on semiconductor technology.

The calculation unit 10 processes the electric signal input thereto to calculate a distance to an object or the like based on heterodyne detection, and includes an ADC (AD converter) 28, a FFT (fast Fourier transformation) circuit 29, and an imaging processing circuit 30. The converters 8, the TIAs 9, and the calculation unit 10 correspond to a processing unit.

The ADC 28 converts the electric signal output from each of the TIAs 9 to a digital signal and outputs the digital signal. The FFT circuit 29 detects a frequency component included in the digital signal output from the ADC 28.

The imaging processing circuit 30 calculates a distance to an object and a speed of the object based on the frequency component detected by the FFT circuit 29 to form two-dimensional data. The data formed by the imaging processing circuit 30 is transmitted to an ECU mounted in a vehicle and not shown or the like to be used for automatic braking for avoidance of a collision with an object or the like.

The foregoing is the configuration of the distance measurement sensor of the present embodiment. Note that the LD 1, the modulator 2, the converters 8, the TIAs 9, the calculation unit 10, and the phase shifters 20 are connected to the external control circuit via wires not shown to operate in response to the electric signal input thereto from the control circuit.

A description will be given of an operation of the distance measurement sensor of the present embodiment. The distance measurement sensor of the present embodiment detects a distance to an object and a speed of the object in accordance with a FMCW method using a coherent property of laser light.

First, when the LD 1 generates light, an optical signal is input from the LD 1 to the modulator 2. The modulator 2 periodically increases and decreases a frequency of the optical signal input thereto to form a triangular wave as shown by the solid line in FIG. 5. The modulator 2 forms the triangular wave having a period T and a frequency increasing and decreasing between $f_0-\Delta f/2$ and $f_0+\Delta f/2$ around $f_0$. The optical signal formed by the modulator 2 is amplified by the amplifier 3, and then input to the scanning unit 5 and the multiplexers 7 via the demultiplexer 4.

The scanning unit 5 periodically changes a phase of the optical signal input thereto using the phase shifters 20. Consequently, a directionality of the light emitted from the side surface of the substrate 11 to the outside of the substrate 11 periodically changes, and the light is caused to scan in the H-direction. The light emitted from the side surface of the substrate 11 to the outside of the substrate 11 is reflected by the mirror 15 to travel in a direction perpendicular to the top surface of the substrate 11 and be applied to each of the lid 17 and the diffusing lens 18.

The light applied to the diffusing lens 18 is diffused in the V-direction and emitted to the outside of the vehicle. At this time, since the light is diffused in the V-direction, the light can simultaneously irradiate a wide range in the V-direction, as shown in FIG. 7.

Figure 7:
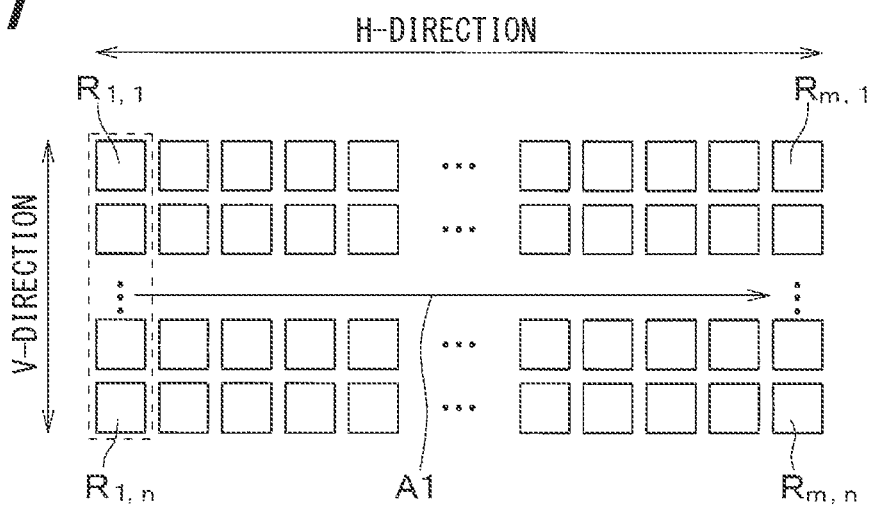
FIG. 7 is a view showing an operation of the distance measurement sensor according to the first embodiment.

Specifically, when the region to be irradiated with the light is divided by m in the H-direction and divided by n in the V-direction, and a region corresponding to an i-th region in the H-direction and corresponding to a j-th region in the V-direction is assumed to be a region $R_{i,j}$, as shown by a broken line in FIG. 7, regions $R_{1,1}$ to $R_{1,n}$ can simultaneously be irradiated with the light. Then, the scanning unit 5 causes the light to scan in the H-direction to allow the regions $R_{i,1}$ to $R_{i,n}$ to be simultaneously irradiated with the light. When the resolution of the distance measurement sensor in the V-direction is set to 20, the regions $R_{i,1}$ to $R_{i,20}$ can be irradiated with the light.

Figure 8:
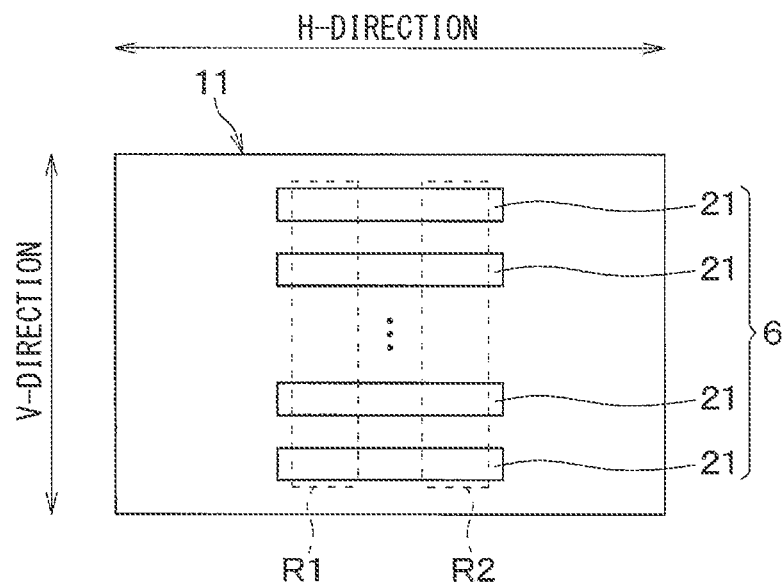
FIG. 8 is a plan view of a light receiver shown in FIG. 1.

The light emitted to the outside of the vehicle is reflected by objects outside the vehicle to be applied to the condensing lens 19, passes through the condensing lens 19, the lid 17, the polarization filter 23, and the BPF 22 to be applied to the light receiving antennas 21. As shown in FIG. 8, the plurality of light receiving antennas 21 arranged in the V-direction can simultaneously receive reflected light beams from the objects included in the plurality of regions arranged in the V-direction. For example, reflected light beams from respective objects included in the regions $R_{1,1}$ to $R_{1,n}$ are applied to a region R1 in FIG. 8, while reflected light beams from respective objects included in the regions $R_{m,1}$ to $R_{m,n}$ are applied to a region R2 in FIG. 8. Thus, to the plurality of light receiving antennas 21, reflected light beams from respective objects included in the regions $R_{i,1}$ to $R_{i,n}$ are applied.

Each of the light beams applied to the light receiving antennas 21 is input to the corresponding multiplier 7 and combined with the optical signal input from the demultiplexer 4 to the multiplexer 7. An optical signal resulting from the multiplexing of the two optical signals by the multiplexer 7 is converted by the corresponding converter 8 to the current signal, further converted by the TIA 9 to the voltage signal, and input to the calculation unit 10.

Note that, for the individual light receiving antennas 21, the multiplexers 7, the converters 8, and the TIAs 9 simultaneously perform processing of the optical signals or the like. In other words, the plurality of multiplexers 7 simultaneously multiplex the reflected light beams from the regions $R_{i,1}$ to $R_{i,n}$ and the optical signal input thereto from the demultiplexer 4 for the individual regions. Then, the plurality of converters 8 and the plurality of TIAs 9 simultaneously convert the optical signals formed by the multiplexers 7 to the electric signals for the individual regions.

Each of the signals input to the calculation unit 10 is converted by the ADC 28 to a digital signal, and then input to the FFT circuit 29. The FFT circuit 29 detects a frequency component of the signal input thereto, and the imaging processing circuit 30 calculates a distance to each of the objects and a speed of the object based on the detected frequency component.

Between the light beam input to each of the multiplexers 7 from the corresponding light receiving antenna 21 and the light beam input to the multiplexer 7 from the demultiplexer 4, a phase difference and a frequency difference are produced by the distance to each of the objects and the speed of the object, as shown in FIG. 5.

In the optical signal formed by each of the multiplexers 7, two beat frequencies appear due to the phase difference and the frequency difference between the two optical signals before being combined with each other. A beat frequency fB1 as one of the two beat frequencies corresponds to the frequency difference when each of the frequencies of the two light beams increases, while a beat frequency fB2 as the other of the two beat frequencies corresponds to the frequency difference when each of the frequencies of the two light beams decreases.

These two beat frequencies depend on a distance to an object and a speed of the object, and therefore the distance to the object and the speed of the object can be calculated from the two beat frequencies. Specifically, when it is assumed that l represents the distance to the object, v represents a relative speed of the object with respect to the distance measurement sensor, and c represents a light speed, $l=cT(f_{B1}+f_{B2})/8\Delta f$, $v=c(f_{B2}-f_{B1})/4f_0$ are satisfied.

The calculation of the distance to each of objects and the speed of the object is performed every time the scanning unit 5 causes the light to scan in the H-direction. Specifically, when the regions $R_{i,1}$ to $R_{i,n}$ are irradiated with the light and distances to respective objects included in the regions $R_{i,1}$ to $R_{i,n}$ or the like are calculated, the scanning unit 5 changes directions in which the light travels. Consequently, as indicated by an arrow A1 in FIG. 7, the regions irradiated with the light are changed. As a result, the regions $R_{i+1,1}$ to $R_{i+1,n}$ are irradiated with the light, and distances to respective objects included in the regions $R_{i+1,1}$ to $R_{i+1,n}$ or the like are calculated. Such operations are successively performed for i=1 to m to calculate distances to respective objects included in the regions $R_{1,1}$ to $R_{m,n}$ or the like. When the calculation of the distances to the objects or the like is ended when i=m is satisfied, the distance measurement sensor repeats similar operations on the assumption that i=1 is satisfied.

The imaging processing circuit 30 forms two-dimensional data based on the calculated distances and speeds every time the calculation of the distances to the objects or the like when i=m is satisfied is ended, and transmits the two-dimensional data to the ECU or the like not shown. As a result, when there is an object at a place close to the vehicle, the automatic brake or the like for avoidance of a collision with the object operates.

Figure 9:
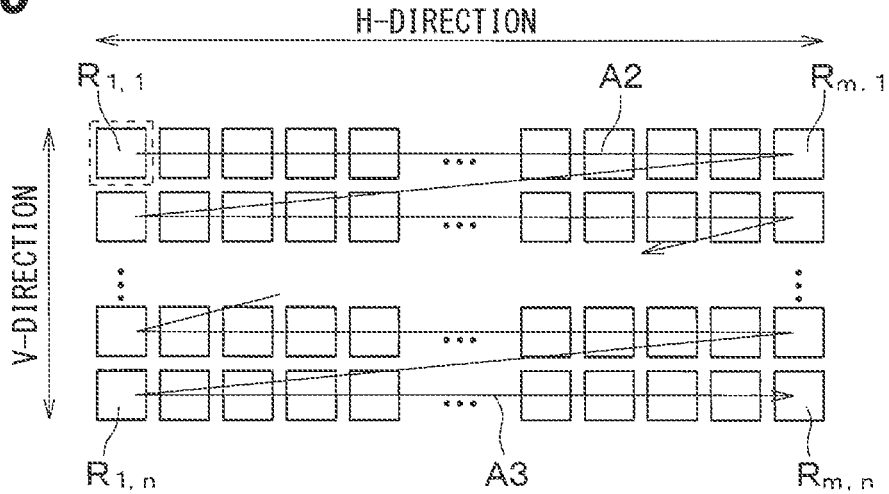
FIG. 9 is a view showing an operation of a related art distance measurement sensor.

A description will be given of effects of the present embodiment. As shown in FIG. 9, a conventional distance measurement sensor applies light to a region defined by a broken line, i.e., one of regions $R_{1,1}$ to $R_{m,n}$ to cause the light to scan in both of the H-direction and the V-direction as indicated by arrows A2 and A3, and successively calculates distances to respective objects included in the individual regions or the like.

By contrast, in the present embodiment, the light emitted from the substrate 11 is diffused in the V-direction by the diffusing lens 18 to be able to simultaneously irradiate a wide range in the V-direction. In addition, the plurality of light receiving antennas 21 are arranged in the V-direction, and the multiplexers 7, the converters 8, and the TIAs 9 are disposed to correspond to the individual light receiving antennas 21. Accordingly, it is possible to simultaneously receive reflected light beams from the wide range in the V-direction, perform parallel processing on the respective signals from the individual light receiving antennas 21, and calculate distances to objects or the like.

This allows distances to respective objects included in a predetermined region or the like to be calculated only through scanning in the H-direction and allows two-dimensional data to be formed. As a result, a distance measuring operation can be performed at a high frame rate, and the distance measurement sensor can be mounted and used in a vehicle moving at a high speed or the like. Also, in the present embodiment in which the light emitted from the substrate 11 is caused to scan only in the H-direction, scanning control is easier than when light is caused to scan in both of the H-direction and the V-direction.

Also, in the present embodiment, the optical waveguides 12 are formed to reach the side surface of the substrate 11, and accordingly the light can be emitted with high efficiency from the side surface of the substrate 11. This improves the SNR of the distance measurement sensor. It is difficult to form the light receiving antennas 21 on the side surface of the substrate 11 and, to apply reflected light beams from objects to the light receiving antennas 21 formed on the top surface of the substrate 11, it is required to cause a mirror to reflect either of the light emitted from the side surface of the substrate 11 and the reflected light beams from the objects. In the present embodiment, as described above, the emitted light is reflected by the mirror 15 to travel in a direction perpendicular to the top surface of the substrate 11. This allows the reflected light beams from the objects to be applied to the light receiving antennas 21 formed on the top surface of the substrate 11 and allows the distance measurement sensor to be used as a LIDAR system.

Also, in the present embodiment, each of the light receiving antennas 21 is formed in a shape elongated in the H-direction. This improves the SNR and allows long distance detection over, e.g., 100 m or more required for an in-vehicle use to be performed.

Also, in the present embodiment, the scanning unit 5 is formed on the substrate 11. This allows a size of the distance measurement sensor to be reduced compared to that when the scanning unit 5 is disposed outside the substrate 11.

Also, in the present embodiment, the BPF 22 and the polarization filter 23 are stacked on each of the light receiving antennas 21. This allows the size of the distance measurement sensor to be reduced compared to that when these filters are disposed at places other than over the substrate 11.

Second Embodiment

A description will be given of a second embodiment. In the second embodiment, the calculation unit 10 is disposed at a place different from that in the first embodiment. The second embodiment is otherwise the same as the first embodiment, and therefore a description will be given only of the portion different from that in the first embodiment.

Figure 10:
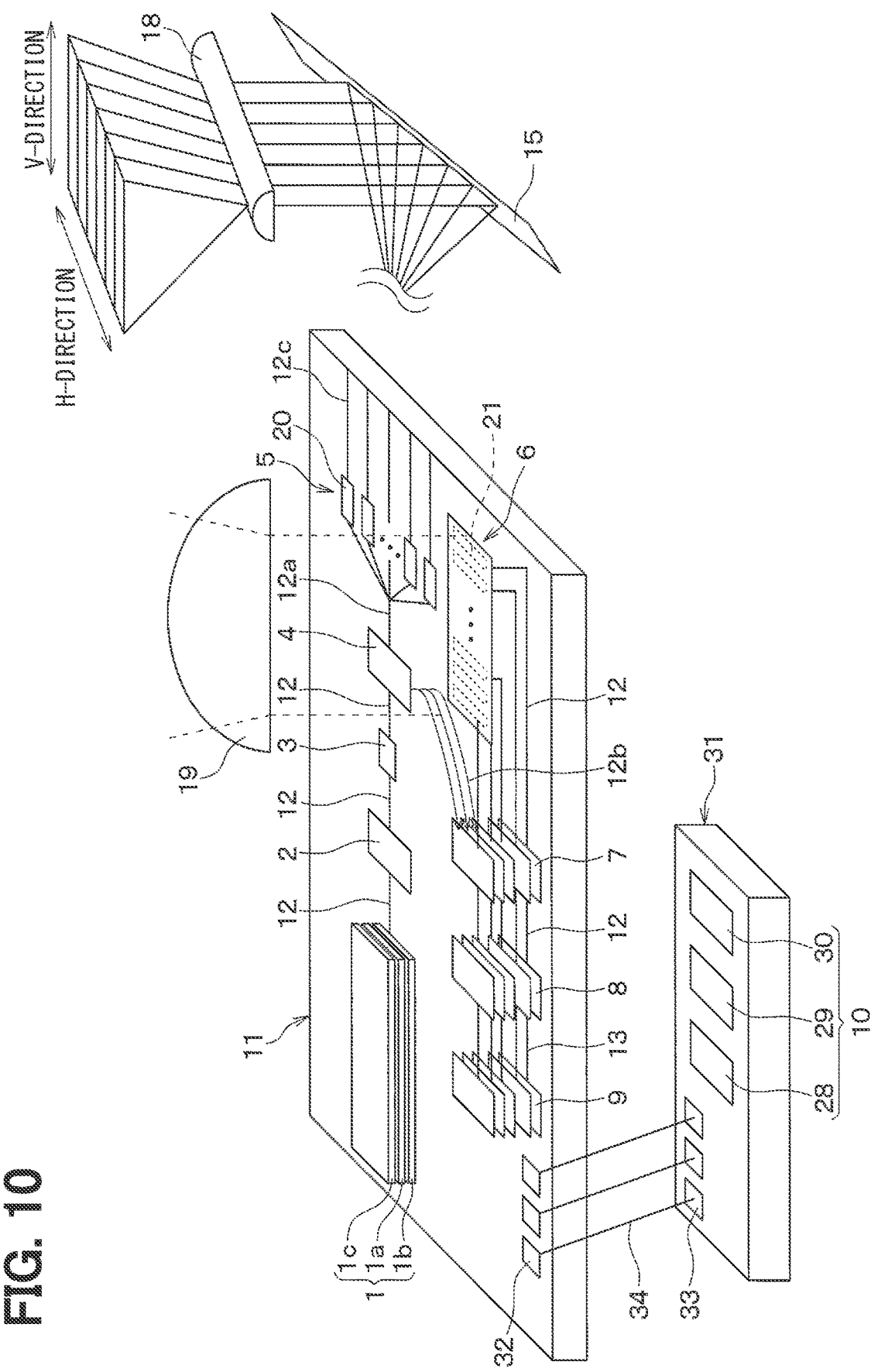
FIG. 10 is a view showing an overall configuration of a distance measurement sensor according to a second embodiment.

As shown in FIG. 10, a distance measurement sensor of the present embodiment includes a substrate 31 other than the substrate 11. In addition, the calculation unit 10 is formed on the substrate 31. Note that the substrate 31 may be disposed either inside the case or outside the case 16.

On the substrate 11 and the substrate 31, pads 32 and pads 33 each formed of a conductive material are formed, respectively. The pads 32 and the pads 33 are connected via bonding wires 34. The TIAs 9 formed on the substrate 11 and the calculation unit 10 formed on the substrate 31 are connected via the pads 32, the pads 33, and the bonding wires 34.

The components formed on the substrate 11 in the first embodiment are assigned to an optical circuit portion to which information is transmitted by an optical signal via the optical waveguides 12 and to an electric circuit portion to which information is transmitted by an electric signal via the wires 13. When a process rule for the optical circuit portion which is determined by a minimum line width of the optical waveguides 12 or the like is significantly different from a process rule for the electric circuit portion including the wires 13, a process rule difference therebetween may increase production cost for the distance measurement sensor.

Accordingly, the calculation unit 10 as a portion of the electric circuit portion is formed on the substrate 31 other than the substrate 11 formed with the optical circuit portion to be able to suppress an increase in production cost resulting from the process rule difference. When there is a production yield difference between the optical circuit portion and the electric circuit portion also, by forming the optical circuit portion and the electric circuit portion on different substrates, it is possible to suppress an increase in production cost.

Third Embodiment

A description will be given of a third embodiment. In the third embodiment, a configuration of the light source is different from that in the second embodiment. The third embodiment is otherwise the same as the second embodiment, and therefore a description will be given only of the portion different from that in the second embodiment.

Figure 11:
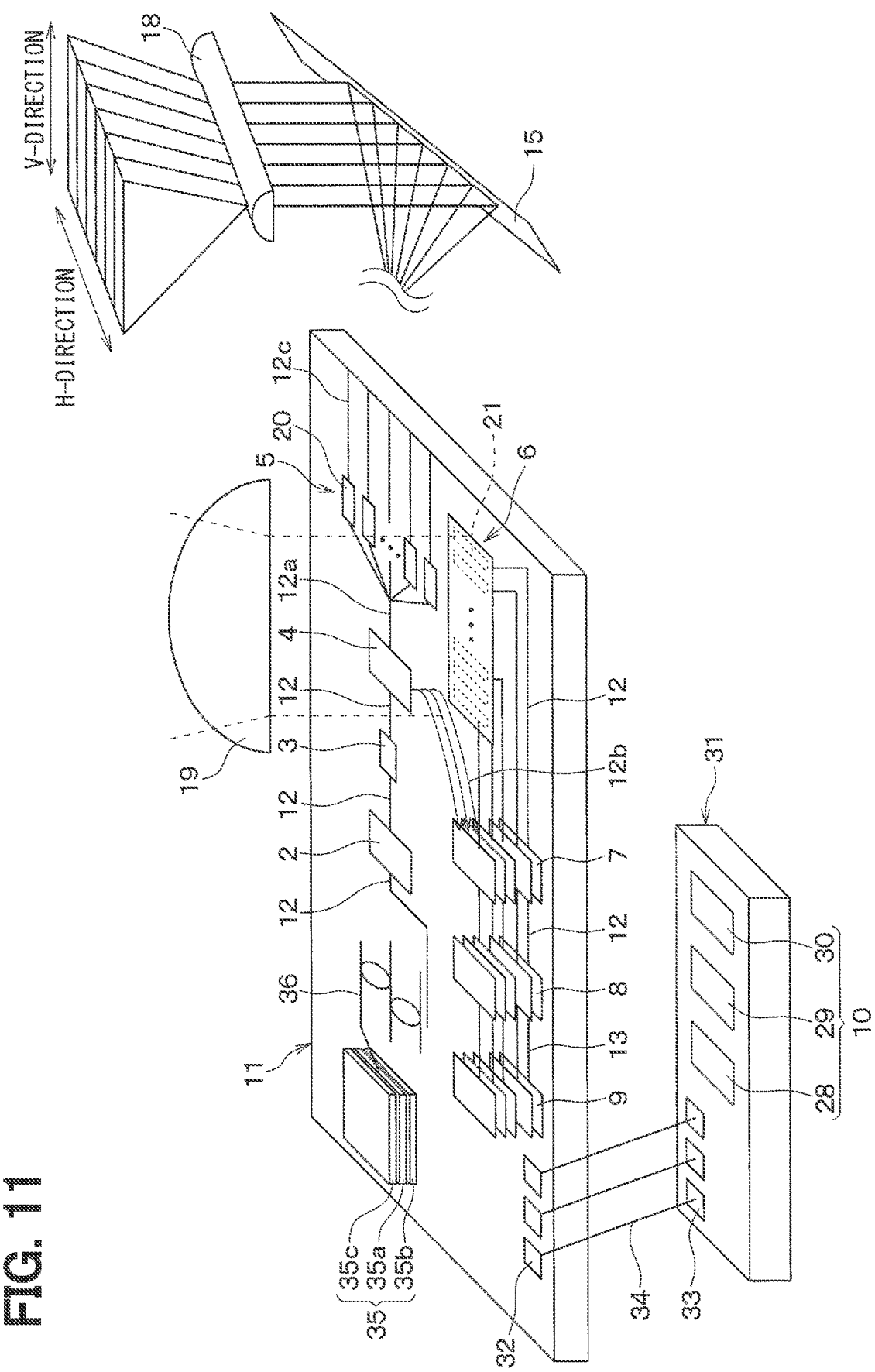
FIG. 11 is a view showing an overall configuration of a distance measurement sensor according to a third embodiment.

As shown in FIG. 11, in the present embodiment, the light source which generates light to be emitted to the outside includes a SOA (semiconductor optical amplifier) 35 and a resonator 36.

The SOA 35 includes an active layer 35a formed of a group III-V semiconductor, and a p-type clad layer 35b and an n-type clad layer 35c which are disposed on both sides of the active layer 35a. These layers are stacked in the order of the p-type clad layer 35b, the active layer 35a, and the n-type clad layer 35c on the substrate 11 by flip-chip bonding or the like. The SOA 35, which is formed of the group III-V semiconductor, has a large output. As the resonator 36, e.g., a double ring resonator or the like is used.

The optical waveguide 12 connecting the resonator 36 and the modulator 2 has a portion forming a coupler. The light generated from the light source including the SOA 35 and the resonator 36 propagates to the modulator 2 via the coupler. In the example shown in FIG. 11, a directional coupler is used as the coupler, but a multimode interference (MMI) coupler may also be used.

In the present embodiment in which the light source includes the SOA 35 and the resonator 36, by elongating a resonator length of the resonator 36, it is possible to allow a line width of laser light generated from the SOA 35 to be smaller than a line width of laser light generated from the LD 1 formed of the DFB laser. This can improve the accuracy of detection of a distance to an object.

Fourth Embodiment

A description will be given of a fourth embodiment. In the fourth embodiment, a configuration of the scanning unit 5 is different from that in the third embodiment. The fourth embodiment is otherwise the same as the third embodiment, and therefore a description will be given only of the portion different from that in the third embodiment.

Figure 12:
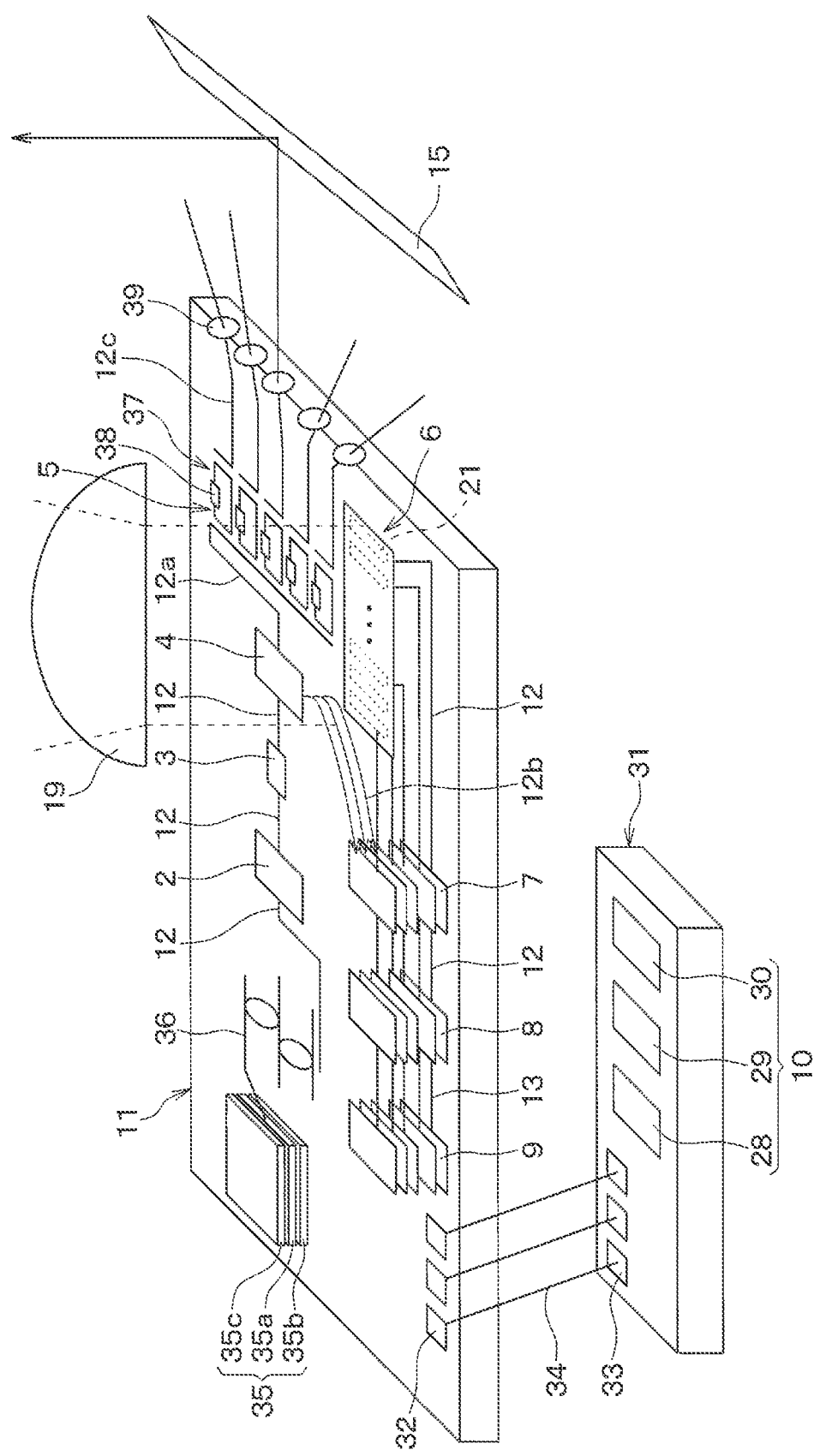
FIG. 12 is a view showing an overall configuration of a distance measurement sensor according to a fourth embodiment.

As shown in FIG. 12, the scanning unit 5 of the present embodiment includes a plurality of optical switches 37. The optical switches 37 are disposed on the individual optical waveguides 12c and include respective micro heaters 38. The micro heaters 38 change temperatures of the optical waveguides 12c and change frequency bands of the optical signals passing through the optical waveguides 12c. The micro heater 38 corresponds to a heat source.

The individual optical waveguides 12c are inclined at different angles with respect to the side surface of the substrate 11 to allow light beams to be emitted at different angles from the individual optical waveguides 12c. At the side surface of the substrate 11, a plurality of collimating lenses 39 are formed to change light beams applied thereto to parallel light beams. The individual optical waveguides 12c are connected to the collimating lenses 39. The light beams that have passed through the optical waveguides 12c are applied to the mirror 15 via the collimating lenses 39.

In the same manner as in the first embodiment, the optical waveguide 12a is branched to the optical waveguides 12c based on the resolution of the distance measurement sensor in the H-direction, and the same number of the optical switches 37 as that of the optical waveguides 12c are disposed.

In the present embodiment having such a configuration, from among the plurality of optical waveguides 12c, the optical waveguide 12c through which the optical signal from the demultiplexer 4 is caused to pass can be selected. In addition, since the light beams are emitted at different angles from the individual optical waveguides 12c, by successively changing the optical waveguide 12c through which the optical signal is caused to pass from one to another, it is possible to cause the light to be emitted to the outside to scan in the H-direction.

When an OPA is used as the scanning unit 5, an optical signal is divided and emitted from the side surface of the substrate 11. By contrast, when the optical switches 37 are used for the scanning unit 5, the optical signal is not divided and is emitted from the selected one of the optical waveguides 12. Accordingly, a demultiplexing loss is small, and use efficiency of the light is higher than when the OPA is used as the scanning unit 5. In addition, since an angle of light emission is determined by an angle of the selected optical waveguide 12c, it is easy to recognize the angle of the light emission.

Fifth Embodiment

A description will be given of a fifth embodiment. In the fifth embodiment, a position of the modulator 2 and the configuration of the scanning unit 5 are different from those in the third embodiment. The fifth embodiment is otherwise the same as the third embodiment, and therefore a description will be given only of the portions different from those in the third embodiment.

Figure 13:
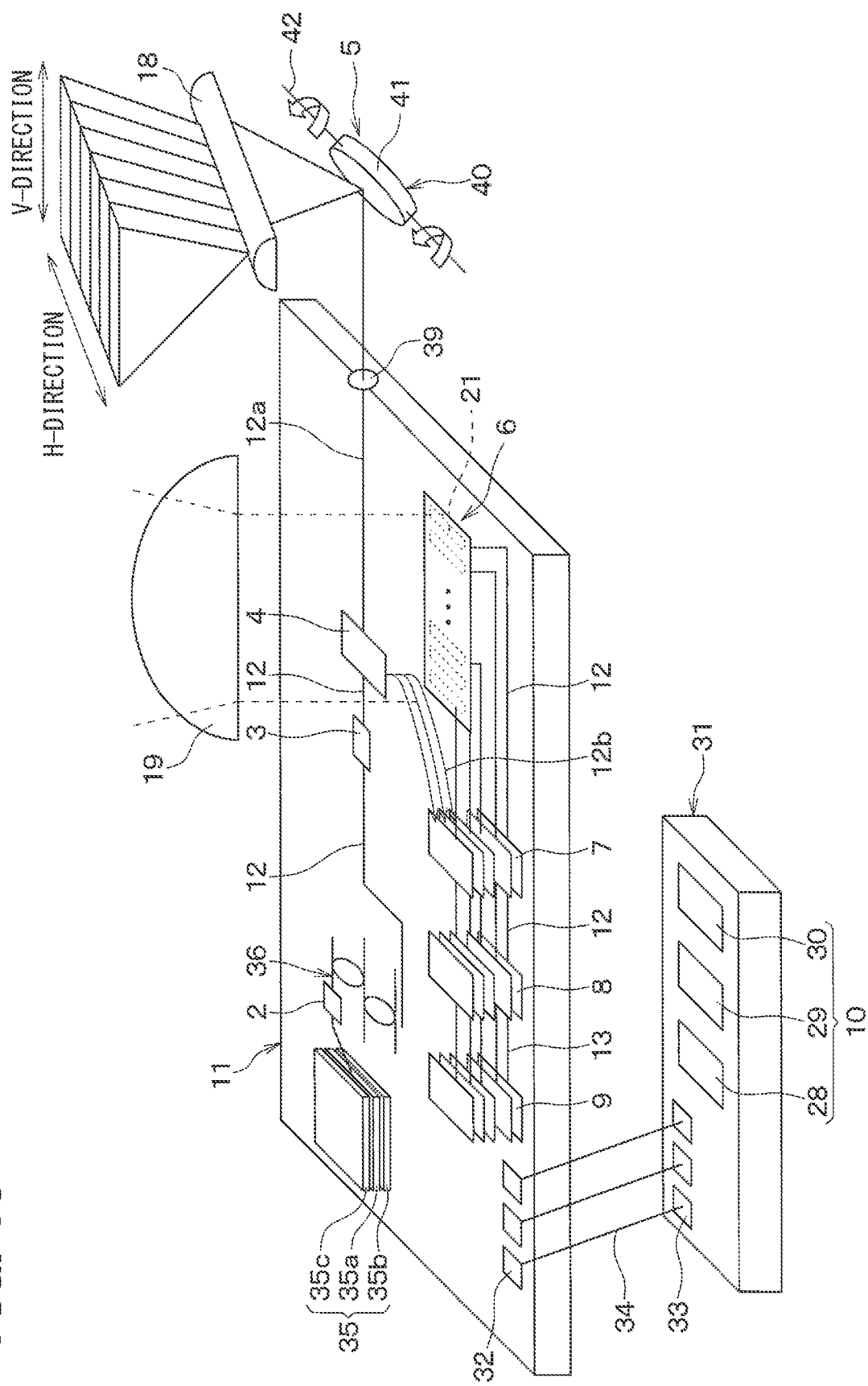
FIG. 13 is a view showing an overall configuration of a distance measurement sensor according to a fifth embodiment.

As shown in FIG. 13, the modulator 2 in the present embodiment is disposed in the resonator 36, and the resonator 36 is connected to the amplifier 3 via the optical waveguide 12. The modulator 2 disposed in the resonator 36 changes a refractive index of the optical waveguide in the resonator 36 to change the resonator length and effect frequency modulation. By thus disposing the modulator 2 and directly changing the resonator length, it is possible to allow light to propagate at a higher efficiency than when SSB modulation using only one of sideband waves is used.

Also, the scanning unit 5 in the present embodiment is formed of a MEMS mirror 40. In addition, the optical waveguide 12a reaches the side surface of the substrate 11, and the optical signal output from the demultiplexer 4 is applied to the MEMS mirror 40 via the collimating lens 39 disposed on the side surface of the substrate 11.

The MEMS mirror 40 is formed by processing a SOI substrate in which a supporting layer formed of Si, a sacrificial layer formed of $SiO_2$, and an active layer formed of Si are successively stacked. The MEMS mirror 40 includes a reflecting portion 41 which reflects light and a beam portion 42 which supports the both ends of the reflecting portion 41.

The MEMS mirror 40 includes a drive unit, not shown, which vibrates the beam portion 42 using, e.g., deformation of a piezoelectric element. As a result of resonation of the beam portion 42 caused by the drive unit, the reflecting portion 41 oscillates around an axis of the beam portion 42. The light emitted from the substrate 11 is reflected by the oscillating reflecting portion 41, and consequently the reflected light travels in a direction substantially perpendicular to the top surface of the substrate 11 to scan in the H-direction. The MEMS mirror 40 corresponds to an oscillation mirror.

In the present embodiment using the MEMS mirror 40, the use efficiency of the light can be improved compared to that when an OPA which entails a branching loss or a waveguide loss or the optical switch 37 which entails a waveguide loss is used.

The MEMS mirror 40 also allows high-speed scanning using the resonance. By forming the reflecting portion 41 of an appropriate material, it is possible to obtain a high reflectance. Also, by disposing an angle sensor such as a strain gauge on the beam portion 42, it is possible to recognize a direction in which light is emitted.

Sixth Embodiment

A description will be given of a sixth embodiment. In the sixth embodiment, a method of adjusting the direction in which the light emitted from the substrate 11 travels is different from that in the first embodiment. The sixth embodiment is otherwise the same as the first embodiment, and therefore a description will be given only of the portion different from that in the first embodiment.

Figure 14:
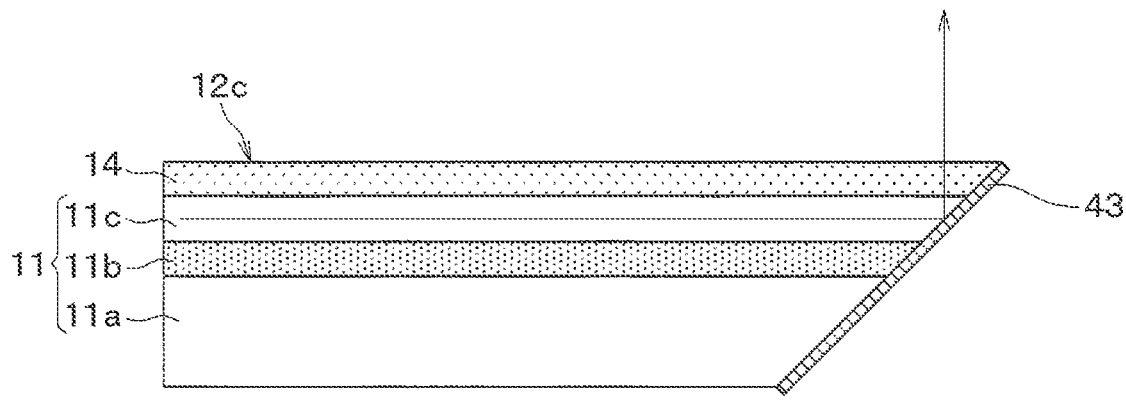
FIG. 14 is a cross-sectional view of a distance measurement sensor according to a sixth embodiment.

As shown in FIG. 14, the substrate 11 of the present embodiment has the side surface inclined with respect to a direction perpendicular to the top surface thereof. Specifically, an angle formed between the side surface and the top surface is set to approximately 45 degrees. The substrate 11 thus configured is formed by removing an angular portion between the side surface and a back surface by etching, polishing, or the like.

On the inclined side surface of the substrate 11, a reflective film 43 formed of Al or the like is formed. The light that has passed through the optical waveguide 12c is reflected by the reflective film 43 formed on the side surface to have the direction of travel thereof changed to the direction perpendicular to the top surface of the substrate 11, and is emitted from the top surface of the substrate 11.

In the present embodiment which thus adjusts the direction of travel of the light using the inclined side surface, the mirror 15 is no longer required to allow the size of the distance measurement sensor to be further reduced.

Seventh Embodiment

A description will be given of a seventh embodiment. In the seventh embodiment, a method of adjusting the direction of travel of the light emitted from the substrate 11 is different from that in the first embodiment. The seventh embodiment is otherwise the same as the first embodiment, and therefore a description will be given only of the portion different from that in the first embodiment.

Figure 15:
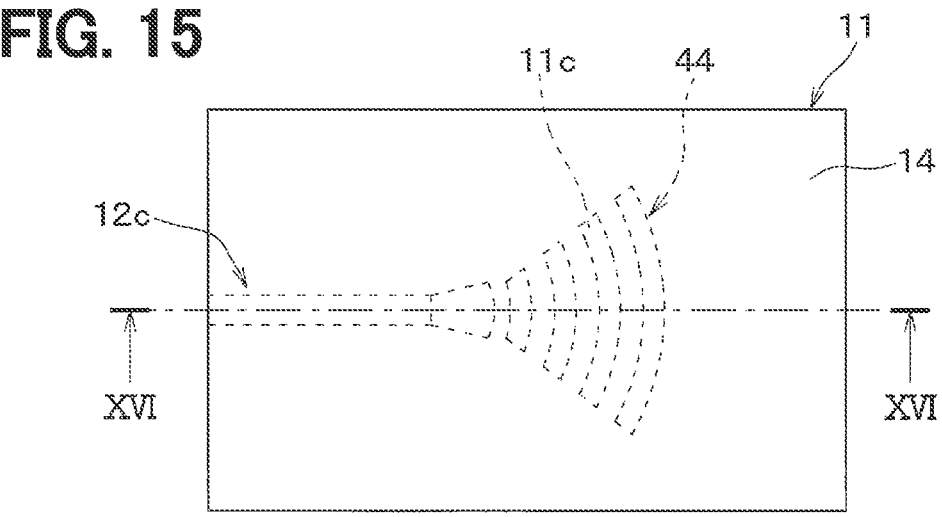
FIG. 15 is a plan view of a distance measurement sensor according to a seventh embodiment.
Figure 16:
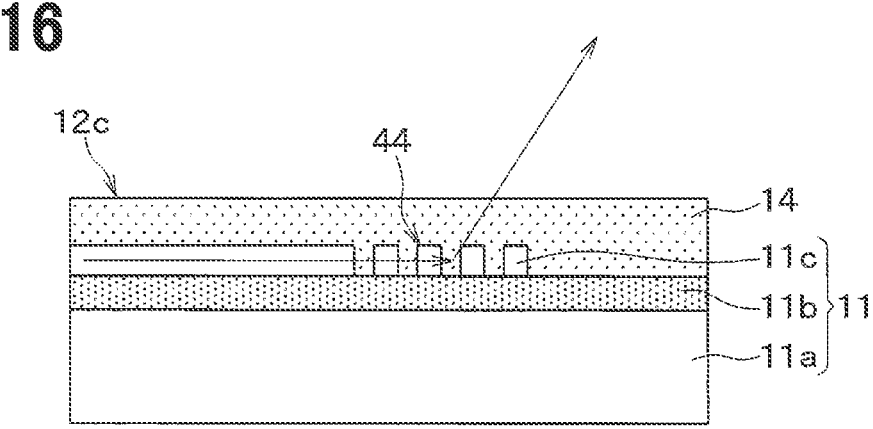
FIG. 16 is a cross-sectional view along a line XVI-XVI in FIG. 15.

As shown in FIGS. 15 and 16, in the present embodiment, a diffractive grating 44 is formed at a tip portion of the optical waveguide 12c. The diffractive grating 44 changes the direction of travel of the light transmitted from the scanning unit 5 from a direction parallel with the top surface of the substrate 11 to a direction inclined with respect to the top surface of the substrate 11, and the light is emitted from the top surface of the substrate 11. The mirror 15 is disposed so as to reflect transmitted light emitted from the top surface of the substrate 11 to a direction perpendicular to the top surface of the substrate 11.

In the present embodiment thus configured, the production of the distance measurement sensor is easier than that in the sixth embodiment in which the side surface of the substrate 11 is processed.

Eighth Embodiment

A description will be given of an eighth embodiment. In the eighth embodiment, a configuration of the light receiving antenna 21 is different from that in the first embodiment. The eighth embodiment is otherwise the same as the first embodiment, and therefore a description will be given only of the portion different from that in the first embodiment.

Figure 17:
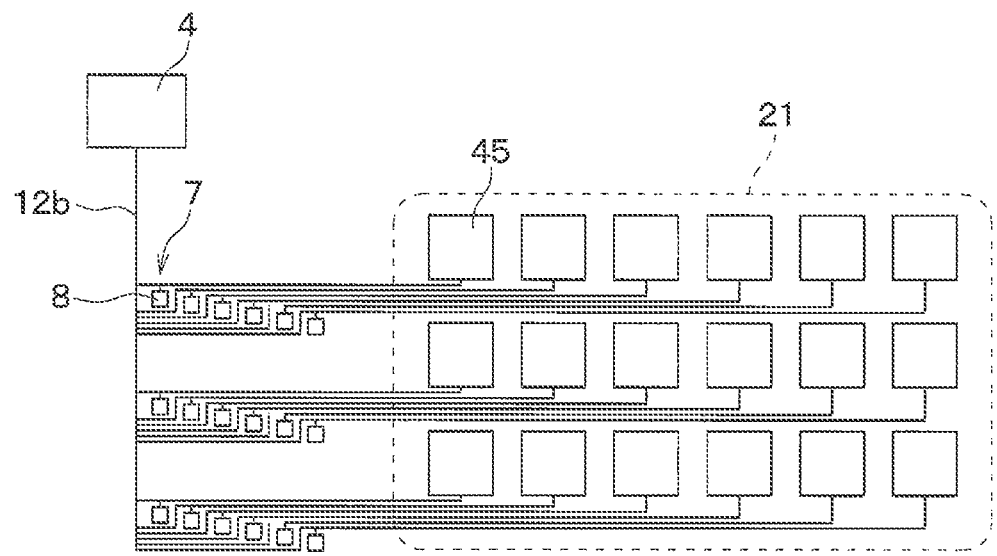
FIG. 17 is a plan view of a distance measurement sensor according to an eighth embodiment.

As shown in FIG. 17, in the present embodiment, the light receiving antenna 21 includes a plurality of diffractive gratings 45 arranged in the H-direction and in the V-direction. Each of the number of the multiplexers 7 and the number of the converters 8 which are disposed corresponds to the number of the diffractive gratings 45. An optical signal from each of the diffractive gratings 45 is combined with the optical signal from the demultiplexer 4 by the corresponding multiplexer 7 and then input to the corresponding converter 8.

Since an angle of light receivable by each of the diffractive gratings and a size of the diffractive grating have a tradeoff relationship therebetween, by reducing the size of the diffractive grating, it is possible to receive the light at angles in a wide range. Accordingly, when an area of a region of the substrate 11 that can be used for the light receiver 6 is determined, by segmentizing the light receiving antenna 21 as segmentized in the present embodiment, it is possible to receive the light at angles in a range wider than that when the light receiving antenna 21 is not segmentized. This can improve the SNR of the distance measurement sensor.

Ninth Embodiment

A description will be given of a ninth embodiment. In the ninth embodiment, the configuration of the light receiving antenna 21 is different from that in the first embodiment. The ninth embodiment is otherwise the same as the first embodiment, and therefore a description will be given only of the portion different from that in the first embodiment.

Figure 18:
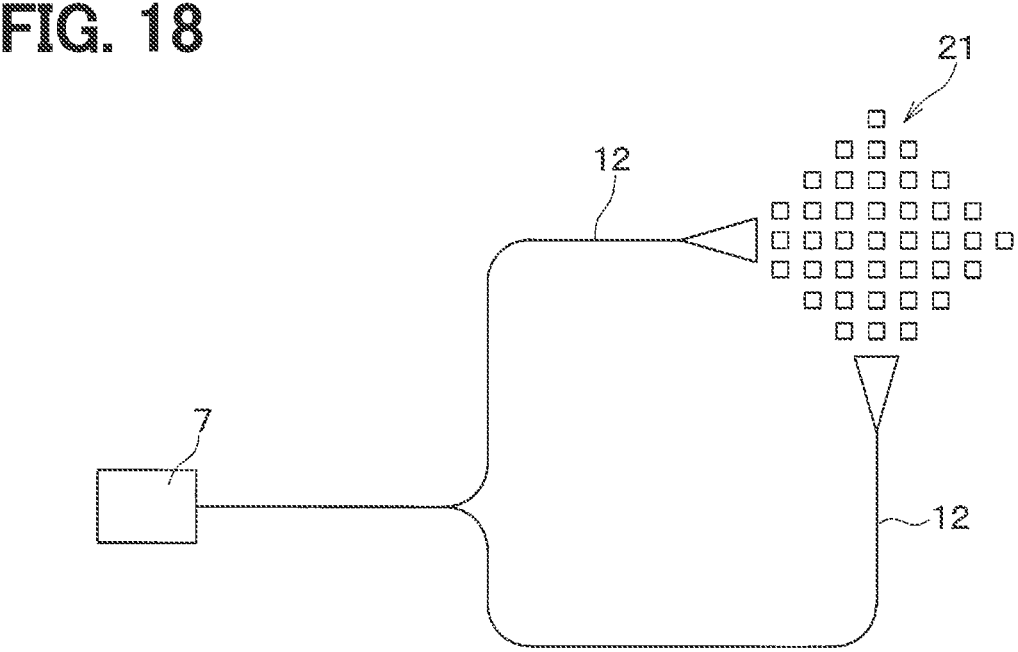
FIG. 18 is a plan view of a distance measurement sensor according to a ninth embodiment.

As shown in FIG. 18, the light receiving antenna 21 in the present embodiment is formed of a diffractive grating having slits formed in two directions perpendicular to each other, and corresponds to polarized light beams in two directions. Such a configuration allows the light beam polarized in one of the two directions and the light beam polarized in the other direction to be received, and improves the SNR of the distance measurement sensor to a value which is at most approximately double the original SNR.

Other Embodiments

Note that the present disclosure is not limited to the embodiments described above and can appropriately be modified. The individual embodiments described above are by no means irrelevant to each other and can appropriately be combined with each other unless it is obvious that the embodiments described above cannot be combined with each other. It goes without saying that, in each of the embodiments described above, a component of the embodiment is not necessarily indispensable unless it is particularly clearly shown that the component is indispensable or the component can be considered to be obviously indispensable in principle. Also, in each of the embodiments described above, when a numerical value such as the number of components of the embodiment, a numerical value, an amount, or a range is mentioned, the numerical value is not limited to the specific number unless it is particularly clearly shown that the numerical value is necessarily limited to the specific number or the numerical value is obviously limited to the specific number in principle. Also, in each of the embodiments described above, when shapes of components, a positional relationship between components, and the like are mentioned, the shapes, the positional relationship, and the like are not limited thereto unless it is particularly clearly shown that the shapes, the positional relationship, and the like are limited thereto or unless the shapes, the positional relationship, and the like are limited thereto in principle.

For example, in the first embodiment described above, the light emitted from the substrate 11 is reflected by the mirror 15, and the direction of travel of each of the light applied to the diffusing lens 18 and the light applied to each of the light receiving antennas 21 is changed to the direction perpendicular to the top surface of the substrate 11. However, it may also be possible to apply the light emitted from the substrate 11 to an external space via the diffusing lens 18 or the like without causing the light emitted from the substrate 11 to be reflected by the mirror 15, while keeping the direction of travel of the light in parallel with the top surface of the substrate 11. In this case, the reflected light from an object is caused to be further reflected by a mirror not shown to be appropriately applied to each of the light receiving antennas 21 formed on the top surface of the substrate 11.

Also, in the first embodiment described above, the scanning unit 5 causes the light to scan in the H-direction, and the plurality of light receiving antennas 21 are arranged in the V-direction on the substrate 11. However, the direction in which the scanning unit 5 causes the light to scan and the direction in which the plurality of light receiving antennas 21 are arranged need not necessarily coincide with the H-direction and the V-direction as long as the scanning unit 5 causes the light to scan in a direction corresponding to the H-direction and the plurality of light receiving antennas 21 are arranged in a direction corresponding to the V-direction. In other words, it is appropriate that the light emitted to the outside of the distance measurement sensor is caused to scan in the H-direction by the operation of the scanning unit 5, and the reflected light beams of the light diffused by the diffusing lens 18 from the regions $R_{i,1}$ to $R_{i,n}$ are applied to the individual light receiving antennas 21. It may also be possible that the scanning unit 5 causes the light to scan in a direction corresponding to the V-direction, and the diffusing lens 18 diffuses the light in a direction corresponding to the H-direction.

Also, in the sixth embodiment described above, the scanning unit 5 may also be formed of the MEMS mirror 40. Specifically, it may also be possible that the optical waveguide 12a is formed to reach the side surface of the substrate 11, the MEMS mirror 40 reflects the light emitted from the top surface of the substrate 11 through the optical waveguide 12a, and the light applied to the diffusing lens 18 scans in the H-direction.

Figure 19:
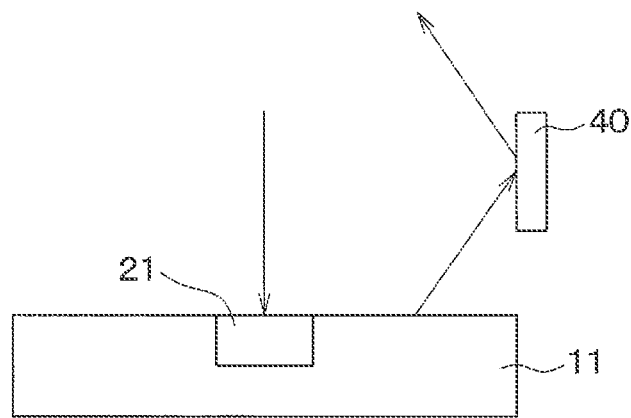
FIG. 19 is a cross-sectional view of a distance measurement sensor according to another embodiment.

Also, in the seventh embodiment described above, it may also be possible to form the diffractive grating 44 at the tip portion of the optical waveguide 12a and form each of the scanning unit 5 and a direction adjustment mirror of the MEMS mirror 40. In other words, it may also be possible that, as shown in FIG. 19, the MEMS mirror 40 reflects the light emitted from the top surface of the substrate 11 via the diffractive grating 44 to cause the light to scan in the H-direction and cause the light to travel in a direction perpendicular to the top surface of the substrate 11.

Figure 20:
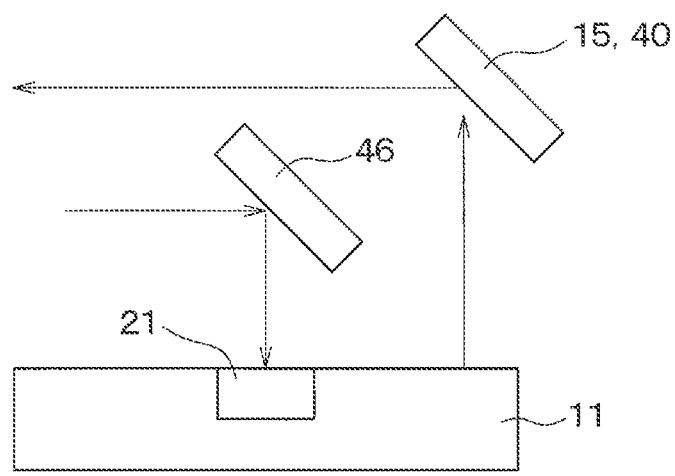
FIG. 20 is a cross-sectional view of a distance measurement sensor according to still another embodiment.

Also, as shown in FIG. 20, it may also be possible that the mirror 15 or the MEMS mirror 40 reflects the light emitted from the top surface of the substrate 11 to cause the light applied to the diffusing lens 18 to travel in a direction parallel with the top surface of the substrate 11. In this case, the reflected light from an object travels in a direction parallel with the top surface of the substrate 11 but, by disposing a mirror 46 outside the substrate 11 and causing the mirror 46 to further reflect the reflected light from the object, it is possible to cause the reflected light to travel in a direction perpendicular to the top surface of the substrate 11 and apply the light to each of the light receiving antennas 21. In a configuration in which two light beams are caused to travel in directions parallel with the top surface of the substrate 11, optical design of the distance measurement sensor is easy. The mirror 46 corresponds to a light receiving mirror.

Also, the distance measurement sensor need not necessarily include the amplifier 3. Also, since the DFB-type laser diode has a function of modulating a frequency of light generated therefrom, when the light source is formed of the LD 1 as the DFB-type laser diode, the distance measurement sensor need not necessarily include the modulator 2. By configuring the distance measurement sensor such that the modulator 2 is not disposed therein, and the optical signal from the LD 1 is input directly to the amplifier 3, the demultiplexer 4, or the like, it is possible to reduce the size of the distance measurement sensor.

Also, in the sixth embodiment described above, the reflective film 43 need not necessarily be formed on the side surface of the substrate 11. Also, in the eighth embodiment described above, the light receiving antenna 21 may also be formed of the plurality of diffractive gratings 45 arranged in either one of the H-direction and the V-direction.

Also, in each of the fourth and fifth embodiments described above, the light source may also be formed of the LD 1. Also, in each of the sixth to ninth embodiments described above, the light source may also include the SOA 35 and the resonator 36. Also, in each of the sixth to ninth embodiments described above, the calculation unit 10 may also be formed on the substrate 31.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A distance measurement sensor that detects a distance to an object, disposed in a predetermined region of an external space defined in one direction and another direction which are perpendicular to each other, based on heterodyne detection using light generated from a light source and another light received by a light receiver, the light source generating the light and the light receiver receiving the another light as a reflection light of the light generated from the light source, and the light source and the light receiver being disposed on a single substrate, the distance measurement sensor comprising:
   a scanning unit which scans the light generated from the light source in a first direction corresponding to the one direction;
   a diffusing lens which diffuses the light generated from the light source in a second direction corresponding to the another direction;
   a plurality of multiplexers which multiplex the light generated from the light source and the another light received by the light receiver to provide a plurality of optical signals, respectively; and
   a processor which detects the distance to the object based on the optical signals provided by the multipliers, wherein:
   the light receiver has a plurality of light receiving antennas arranged in the second direction corresponding to the another direction;
   the multiplexers are connected to the light receiving antennas, respectively; and
   the processor performs a parallel processing for detecting the distance to the object based on the optical signals provided by the multiplexers with respect to the light receiving antennas individually.

2. The distance measurement sensor according to claim 1, further comprising:
   a condensing lens which condenses the reflection light of the light generated from the light source and irradiates a condensed reflection light to each of the light receiving antennas, wherein:

a travel direction of the light emitted from the light source to the diffusing lens is in parallel to another travel direction of the another light received by the light receiving antenna from the condensing lens.

3. The distance measurement sensor according to claim 2, further comprising:
a direction adjustment mirror which adjusts the travel direction of the light generated from the light source to set the travel direction of the light emitted from the light source to the diffusing lens to be in parallel to the travel direction of the another light received by the light receiving antenna from the condensing lens.

4. The distance measurement sensor according to claim 3, wherein:
the direction adjustment mirror adjusts the travel direction of the light generated from the light source to set the travel direction of the light emitted from the light source to the diffusing lens to be perpendicular to a top surface of the single substrate.

5. The distance measurement sensor according to claim 3, wherein:
the direction adjustment mirror adjusts the travel direction of the light generated from the light source to set the travel direction of the light emitted from the light source to the diffusing lens to be in parallel to a top surface of the single substrate.

6. The distance measurement sensor according to claim 5, wherein:
the reflection light of the light generated from the light source has the travel direction adjusted by a light receiving mirror disposed outside the single substrate to a third direction perpendicular to the top surface of the single substrate, and then an adjusted reflection light is irradiated to each of the light receiving antennas.

7. The distance measurement sensor according to claim 1, wherein:
the scanning unit includes:
a plurality of scanning optical waveguides; and
a plurality of phase shifters individually disposed on the plurality of scanning optical waveguides, respectively; and
the scanning unit scans the light generated from the light source in the first direction corresponding to the one direction by changing a phase of light emitted from each of the scanning optical waveguides to control a directionality of light emitted from the plurality of scanning optical waveguides as a whole.

8. The distance measurement sensor according to claim 1, wherein:
the scanning unit includes:
a plurality of scanning optical waveguides; and
a plurality of heat sources individually disposed on the plurality of scanning optical waveguides, respectively; and
the scanning unit scans the light generated from the light source in the first direction corresponding to the one direction by changing a temperature of each of the scanning optical waveguides using the heat sources to select one of the scanning optical waveguides through which the light generated from the light source passes.

9. The distance measurement sensor according to claim 1, further comprising:
an oscillation mirror including a reflector which reflects light and a beam which supports both ends of the reflector, wherein:
the reflector oscillates by vibration of the beam; and
the scanning unit includes the oscillation mirror.

10. The distance measurement sensor according to claim 9, wherein:
the oscillation mirror adjusts the travel direction of the light generated from the light source to a third direction perpendicular to a top surface of the single substrate.

11. The distance measurement sensor according to claim 9, wherein:
the oscillating mirror adjusts the travel direction of the light generated from the light source to a fourth direction parallel to the top surface of the single substrate.

12. The distance measurement sensor according to claim 1, wherein:
the light generated from the light source is emitted from a side surface of the single substrate.

13. The distance measurement sensor according to claim 1, wherein:
the light generated from the light source is emitted from the top surface of the single substrate.

14. The distance measurement sensor according to claim 13, wherein:
the light generated from the light source has the travel direction adjusted by a diffractive grating disposed on the substrate, and then an adjusted light is emitted from the top surface of the single substrate.

15. The distance measurement sensor according to claim 13, wherein:
a side surface of the single substrate is inclined with respect to a third direction perpendicular to the top surface of the substrate; and
the light generated from the light source is reflected by the side surface of the single substrate inclined with respect to the third direction perpendicular to the top surface of the single substrate to be emitted from the top surface of the single substrate.

16. The distance measurement sensor according to claim 15, wherein:
a reflection film for reflecting the light generated from the light source is disposed on the side surface of the single substrate inclined with respect to the third direction perpendicular to the top surface of the single substrate.

17. The distance measurement sensor according to claim 1, further comprising:
a modulator which modulates a frequency of the light generated from the light source, wherein:
the light source is a laser diode including an active layer made of a group III-V semiconductor, and a p-type clad layer and an n-type clad layer which are arranged on both sides of the active layer, respectively.

18. The distance measurement sensor according to claim 1, wherein:
the light source is a laser diode having a function of modulating a frequency of the light generated therefrom.

19. The distance measurement sensor according to claim 1, further comprising:
a semiconductor optical amplifier including an active layer made of a group III-V semiconductor, and a p-type clad layer and an n-type clad layer which are disposed on both sides of the active layer, respectively; and
a resonator arranged on the single substrate, wherein:
the light source includes the semiconductor optical amplifier and the resonator.

20. The distance measurement sensor according to claim 1, wherein:
each of the light receiving antennas is a diffractive grating.

21. The distance measurement sensor according to claim 20, wherein:
the plurality of light receiving antennas are respectively a plurality of diffractive gratings (45) arranged in one or both of the first direction corresponding to the one direction and the second direction corresponding to the another direction.

22. The distance measurement sensor according to claim 20, wherein:
each of the light receiving antennas is a diffractive grating having slits in two directions.

23. The distance measurement sensor according to claim 1, further comprising:
a bandpass filter and a polarization filter which are stacked on each of the light receiving antennas.

24. The distance measurement sensor according to claim 1, wherein:
a signal transmission optical waveguide for transmitting the optical signal is arranged on the single substrate, wherein:
a core layer of the signal transmission optical waveguide is made of Si or at least one material selected from the group consisting of $SiO_2$, SiN, SiON, LN, and InP each of which is doped with an impurity; and
a clad layer of the signal transmission optical waveguide covering the core layer is made of at least one material selected from the group consisting of $SiO_2$, SiN, SiON, LN, and InGaAsP.

25. The distance measurement sensor according to claim 1, further comprising:
a plurality of converters (8) which respectively convert the optical signals provided by the multiplexers to electric signals, wherein:
a wavelength of the light generated from the light source is 0.85 µm or more and 0.95 µm or less; and
each of the converters is a photodiode made of a Si semiconductor.

26. The distance measurement sensor according to claim 1, further comprising:
a plurality of converters which respectively convert the optical signals provided by the multiplexers to electric signals, wherein:
a wavelength of the light generated from the light source is 1.5 µm or more and 1.6 µm or less; and
each of the converters is a photodiode made of a Ge semiconductor.

27. The distance measurement sensor according to claim 1, wherein:
a part of the processor is disposed on another substrate other than the single substrate.

* * * * *